United States Patent
Fujii

(10) Patent No.: US 8,331,452 B2
(45) Date of Patent: Dec. 11, 2012

(54) IMAGE ENCODING APPARATUS, METHOD OF CONTROLLING THEREFOR, AND PROGRAM

(75) Inventor: Akio Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1074 days.

(21) Appl. No.: 12/207,157

(22) Filed: Sep. 9, 2008

(65) Prior Publication Data

US 2009/0080529 A1 Mar. 26, 2009

(30) Foreign Application Priority Data

Sep. 26, 2007 (JP) ................................. 2007-250067

(51) Int. Cl.
H04N 11/02 (2006.01)

(52) U.S. Cl. ......... 375/240.16; 375/240.11; 375/240.14; 375/240.25; 375/240.15; 348/700

(58) Field of Classification Search ............. 375/240.11, 375/240.14, 240.25, 240.15–240.16; 348/700
See application file for complete search history.

(56) References Cited

U.S. PATENT DOCUMENTS 5,508,743 A * 4/1996 Iizuka ........................ 348/415.1
6,480,544 B1 * 11/2002 Uehara et al. ............ 375/240.16
6,778,606 B2 * 8/2004 Kang et al. ............... 375/240.16
6,784,927 B1 * 8/2004 Itokawa ..................... 348/208.1
7,272,183 B2 * 9/2007 Abiko et al. ............. 375/240.16

FOREIGN PATENT DOCUMENTS

JP 10-322661 12/1998
JP 2002-033990 1/2002

OTHER PUBLICATIONS

Jian et. al. a highly Efficient transport protocol for low bit rate multimedia communications, 2005 Springer Science.*

* cited by examiner

Primary Examiner — Thanhnga B Truong
Assistant Examiner — Josnel Jeudy
(74) Attorney, Agent, or Firm — Cowan Liebowitz & Latman, P.C.

(57) ABSTRACT

An image encoding apparatus for performing inter-frame encoding of moving image data is provided. The apparatus refers to a block within a frame other than a current frame to generate a first prediction image of a block to be encoded within the current frame, and performs prediction encoding using the first prediction image. The apparatus sets areas at set positions that differ from each other at least between mutually adjacent frames; and determines whether the block to be encoded within the current frame belongs to the area set with respect to the current frame. When the block to be encoded has been determined to belong to the area, the first prediction image is generated, with regard to the block to be encoded, upon referring to a frame that is decodable on its own and, in terms of time, is situated ahead of and closest to the frame to be encoded.

18 Claims, 7 Drawing Sheets

IMAGE ENCODING APPARATUS, METHOD OF CONTROLLING THEREFOR, AND PROGRAM

BACKGROUND OF THE INVENTION

1. Field of the Invention

The present invention relates to an image encoding apparatus, a method of controlling this apparatus and a program for executing such control.

2. Description of the Related Art

Digital video cameras in which image data is encoded by inter-frame encoding and recorded on a recording medium such as tape, optical disk, or flash memory, etc., have proliferated in recent years. Conventionally, MPEG-2 and MPEG-4 are used as methods of inter-frame encoding of image data. Another method employed recently is the recording and/or playback of image data using H.264/AVC, which has a better encoding efficiency than MPEG-2 and MPEG-4.

The encoding schemes such as MPEG-2, MPEG-4, and H.264/AVC perform encoding on a per-block basis, where a block includes several pixels in one frame. As illustrated in FIG. 5, pixels in horizontal and vertical directions are collected together in units of 8×8 pixels each (the unit is referred to as a "DCT block"), and a plurality of these DCT blocks are collected together to form a macroblock. A luminance signal is composed of four DCT blocks, and two color-difference signals are composed of one DCT block each, for a total of six DCT blocks. A plurality of macroblocks are collected together to form a slice. The MPEG-2 scheme performs encoding in units of the above-mentioned frame, slice, macroblock, and DCT block. FIGS. 4A and 4B illustrate encoding in MPEG-2 and H.264/AVC, respectively.

First, FIG. 4A illustrates which type of encoding each image frame is performed along a time axis t in MPEG-2. The horizontal axis is the time axis. For example, an image K0 represents a frame image at time t0.

The image K0 at time t0 is encoded by intra-frame encoding [I-frame (K0')]. Next, an image K3 at time t3 is encoded by inter-frame encoding with reference to an image obtained by locally decoding the image K0' which was encoded by intra-frame encoding [P-frame (K3')].

Next, an image K1 at time t1 is encoded by inter-frame encoding with reference to the image obtained by locally decoding the image K0' which was encoded by intra-frame encoding and an image obtained by locally decoding the image K3' which was encoded by inter-frame encoding [B-frame (K1')]. Next, an image K2 at time t2 is encoded by inter-frame encoding with reference to the image obtained by locally decoding the image K0' which was encoded intra-frame encoding and an image obtained by locally decoding the image K3' which was encoded by inter-frame encoding [B-frame (K2')].

Frame images K6, K9, K12 are thus prediction-encoded as P-frames using the immediately preceding I-frame or P-frame in the past as a reference. That is, one-directional predictions are performed (K6', K9', K12'). Further, frame images K4, K5, K7, K8, K10, K11, K13, K14 are prediction-encoded from an immediately preceding or immediately succeeding I-frame or P-frame in the past or future. That is, bi-directional predictions are performed (K4', K5', K7', K8', K10', K11', K13', K14').

Further, according to MPEG-2 as illustrated in FIG. 4A, images K-2 to K12 are handled upon being collected together as a GOP (Group of Pictures) so as to include at least one frame that has been obtained by intra-frame encoding. The beginning of the encoded GOP is an I-frame.

In the H.264/AVC scheme, inter-frame encoding and intra-frame encoding are performed in slice units, as illustrated in FIG. 4B. A slice s−1 of an image F(n0) at time tn0 is encoded by bi-directional prediction encoding (B-slice). A B-frame in MPEG-2 has a frame encoded as an I- or P-frame immediately preceding or immediately succeeding this frame as its reference frame, but the B-slice may take its reference frame from any past or future frame, as illustrated in FIG. 4B.

The B-slice s−1 of image F(n0) in FIG. 4B is a mixture of two types of macroblocks. The first is a macroblock for which the reference images are images F(q), F(q−2) at past times tq and tq−2, respectively. The second is a macroblock for which the reference images are images F(q−1), F(s) at a past time tq−1 and future time ts, respectively. Further, two types of macroblocks are mixed also in I-slice s−2 of image F(n0) at time tn0. The first is a macroblock that is prediction-encoded with an image F(q−3) at a past time tq−3 serving as the reference image, and the second is a macroblock that is prediction-encoded with an image F(s+1) at a future time ts+1 serving as the reference image.

In a system in which generated encoded data is recorded on a medium, an IDR (Instantaneous Decoding Refresh) frame is inserted for the purpose of assuring playback in a case where an image is played back from some midpoint on the medium. The IDR frame is a frame capable of being decoded on its own, and another slice cannot refer to the slice of a frame that is beyond the IDR frame.

In other words, each slice between IDR−0 and IDR−1 shown in FIG. 4B must not refer to a frame farther in the past than IDR−0 and must not refer to a slice farther in the future than IDR−1. Further, a slice between IDR−0 and IDR−1 is not referred from a slice farther in the past than IDR−0, and a slice between IDR−0 and IDR−1 is not referred from a slice farther in the future than IDR−1.

In a case where an attempt is made to display an image by searching for encoded data that has been recorded on a recording medium, an I-frame (an IDR frame if the scheme is H.264/AVC) whose playback on its own is assured is read from the recording medium, decoded, played back, and displayed. However, when the I-frame is played back and displayed, frames with blank intervals in terms of time are displayed. Depending upon the search speed, therefore, the picture is not readily updated and will lead to a search image that appears odd.

In order to solve this problem, a technique has been proposed in which, in the case of MPEG-2, three I-frames or P-frames from the beginning of the GOP are acquired from a medium, decoded, and displayed (see the specification of Japanese Patent Application Laid-Open No. 10-322661).

Further, a technique has been proposed in which search data that is capable of being played back on its own is prepared with regard to multiple stages of fixed search magnifications, the data is recorded on a tape-like medium at trace positions for each of the respective magnifications, and the search data is played back when a search is conducted (see the specification of Japanese Patent Application Laid-Open No. 2002-33990).

With the technique proposed by Japanese Patent Application Laid-Open No. 10-322661, however, several P-frames are played back from the initial I-frame. As a result, the odd appearance of the search image still remains, i.e., the image initially moves a little, stops for a while and then moves a little.

Further, with the technique proposed by Japanese Patent Application Laid-Open No. 2002-33990, search data conforming to search magnification can be obtained. However, data for trickplay must be prepared and the amount of stored data increases. Furthermore, this proposal is a technique premised upon a tape-like medium and is not suited to a disk-like medium, etc.

Furthermore, in encoding according to H.264/AVC, there is no P-frame and the search image must rely upon the IDR frame, as described above.

Accordingly, the present invention provides an encoding technique in which, at search mode playback, at least some frames other than an IDR frame can be decoded based on an IDR frame, the picture can be updated and, as a result, it is possible to improve the quality of a search image.

SUMMARY OF THE INVENTION

According to one aspect of the present invention, there is provided an image encoding apparatus for performing inter-frame encoding of moving image data, the apparatus having an inter-frame motion compensation unit configured to refer to a block within a frame other than a current frame to generate a first prediction image of a block to be encoded within the current frame, and an encoding unit configured to perform prediction encoding using the first prediction image, the apparatus comprising: a setting unit configured to set areas at set positions that differ from each other at least between mutually adjacent frames, the setting being performed for every frame included in the motion-picture data; and a determination unit configured to determine whether the block to be encoded within the current frame that is encoded by inter-frame encoding belongs to the area set with respect to the current frame; wherein when the block to be encoded has been determined by the determination unit to belong to the area that has been set, the inter-frame motion compensation unit generates the first prediction image, with regard to the block to be encoded, upon referring to a frame that is decodable on its own and, in terms of time, is situated ahead of and closest to the frame to be encoded.

According to another aspect of the present invention, there is provided an image encoding apparatus for performing inter-frame encoding of moving image data, the apparatus having an inter-frame motion compensation unit configured to refer to a block within a frame other than a current frame to generate a first prediction image of a block to be encoded within the current frame, and an encoding unit configured to perform prediction encoding using the first prediction image, the apparatus comprising: a setting unit configured to set areas at set positions that differ from each other at least between mutually adjacent frames, the setting being performed for every frame included in the motion-picture data; and a determination unit configured to determine whether the block to be encoded within the current frame that is encoded by inter-frame encoding belongs to the area set with respect to the current frame; wherein when the block to be encoded has been determined by the determination unit to belong to the area that has been set, the inter-frame motion compensation unit generates the first prediction image, with regard to the block to be encoded, upon referring to an IDR frame.

Further features of the present invention will become apparent from the following description of exemplary embodiments with reference to the attached drawings.

DESCRIPTION OF THE EMBODIMENTS

Some embodiments of the present invention will now be described in detail with reference to the accompanying drawings.

First Embodiment

An H.264/AVC-compliant image encoding apparatus according to a first embodiment of the present invention will be described with reference to FIGS. 1 and 2.

Figure 1:
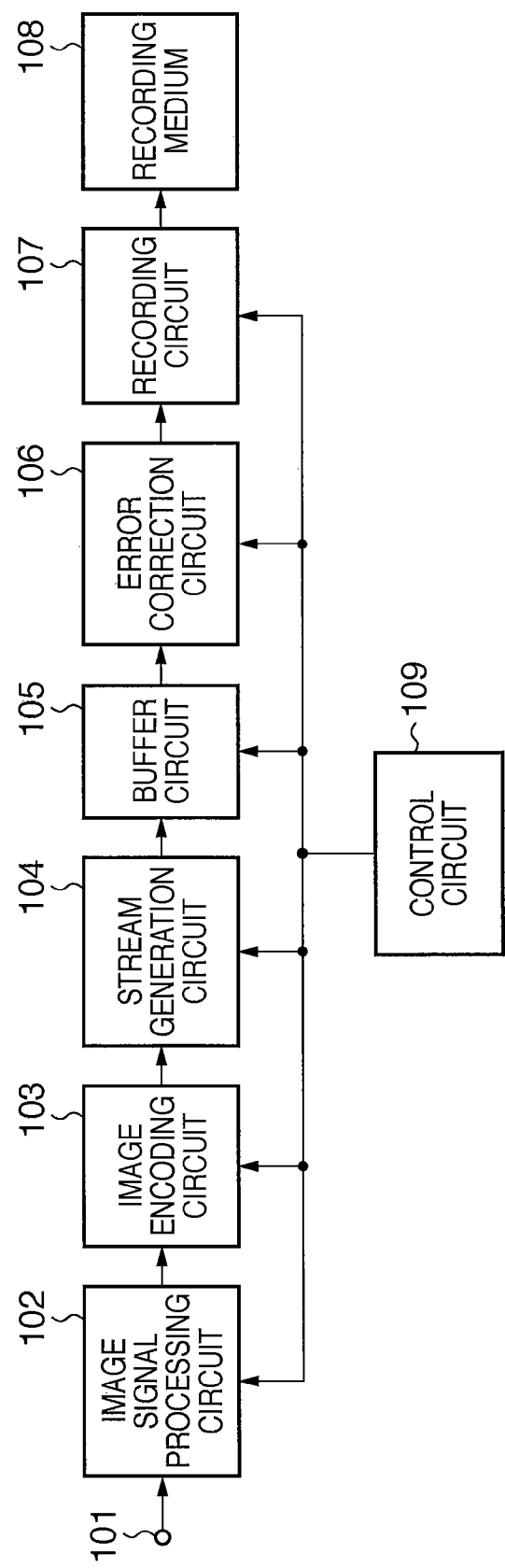
FIG. 1 illustrates an example of the configuration of an image encoding apparatus according to a first embodiment of the present invention.

As shown in FIG. 1, the image encoding apparatus includes an input terminal 101 for inputting image data from an image sensor (not shown), an image signal processing circuit 102 for processing a image signal as moving image data, and an image encoding circuit 103 for encoding image data by a scheme based on H.264/AVC. The image encoding apparatus of FIG. 1 further includes a stream generation circuit 104 for generating a stream of image data, a buffer circuit 105 for buffering recording data, an error correction circuit 106, a recording circuit 107 for modulating data to data for recording, a recording medium 108, and a control circuit 109 for controlling each of the blocks 102 to 107.

When recording starts, moving image data from the image sensor (not shown) is input from the input terminal 101 and the image signal processing circuit 102 performs luminance- and color-signal processing for the moving image data. The result of processing is sent to the image encoding circuit 103.

Figure 4A:
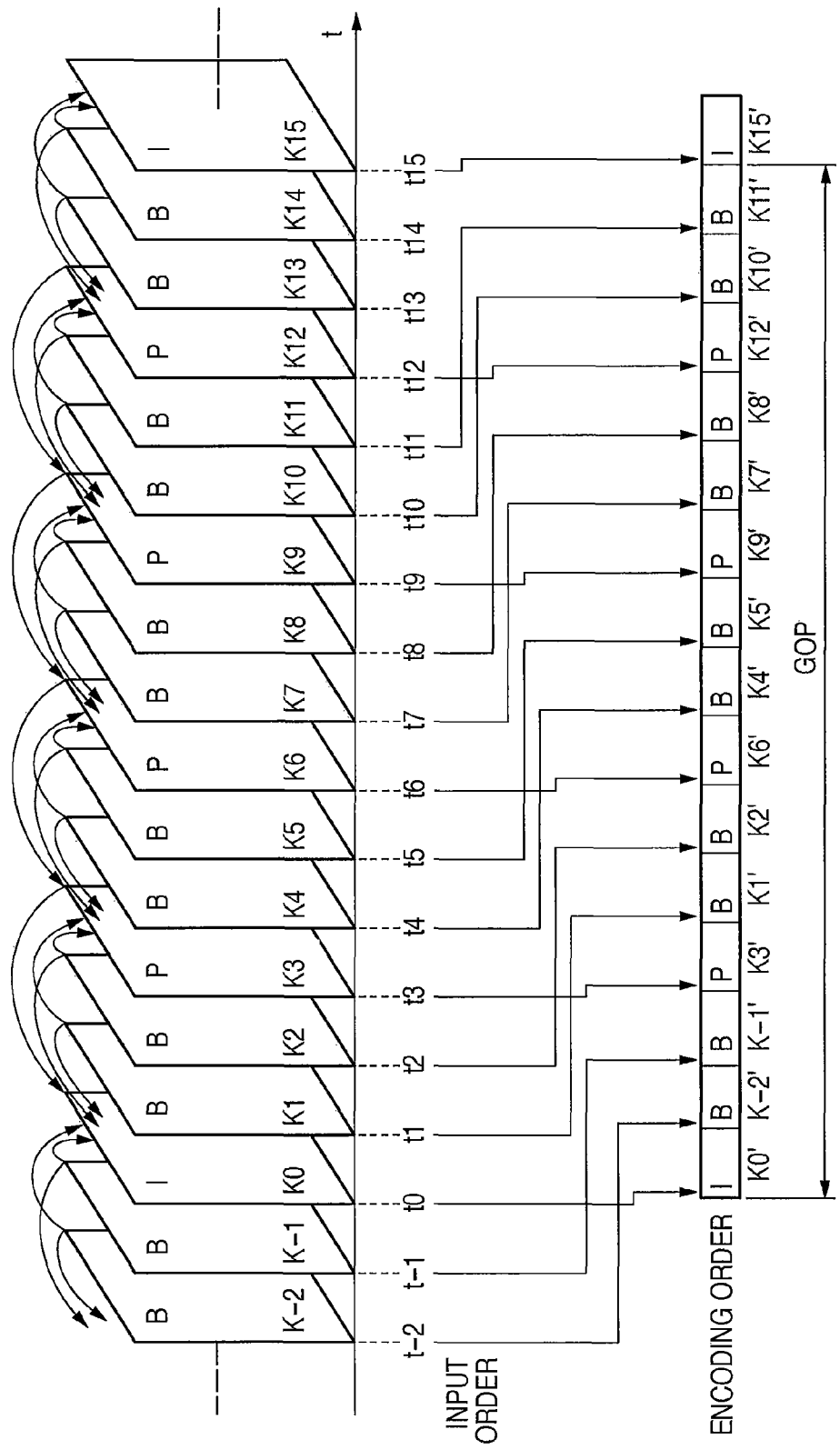
FIG. 4A illustrates a reference relationship in image encoding according to the MPEG-2 scheme.
Figure 4B:
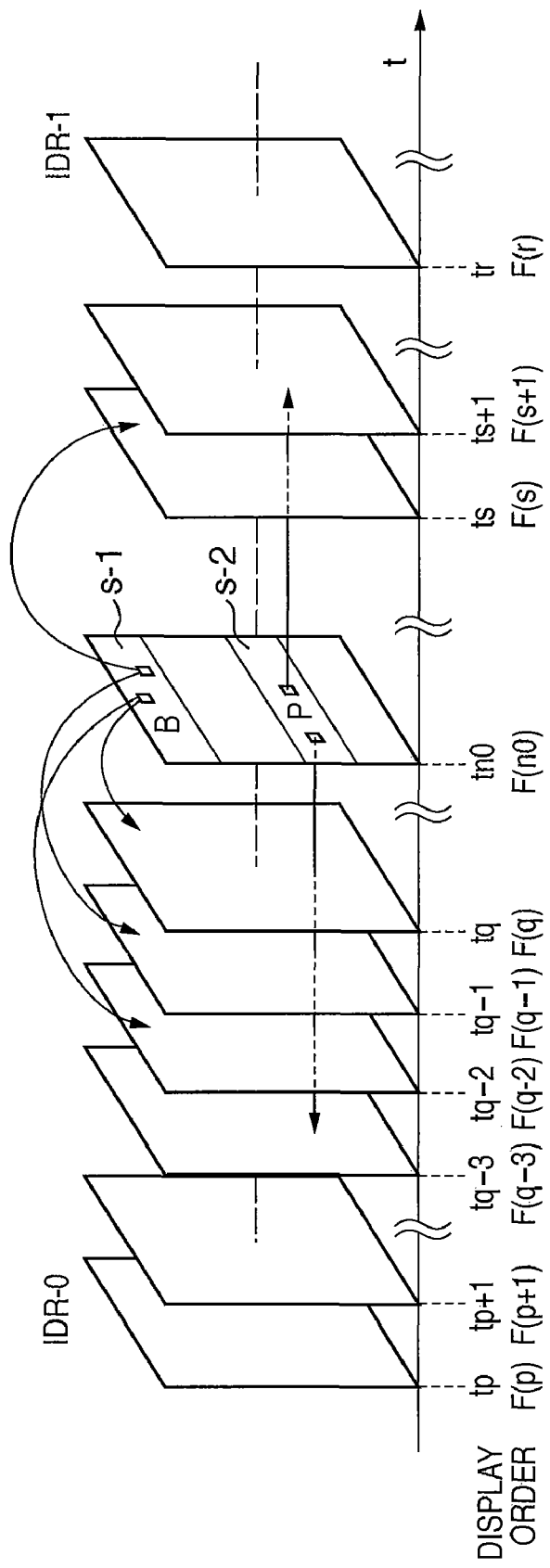
FIG. 4B illustrates a reference relationship in image encoding according to the H264/AVC scheme.

If we let tp represent the time at which recording starts, as illustrated in FIG. 4B, the control circuit 109 controls the image encoding circuit 103 to encode the frame F(p) at this time as IDR–0.

Figure 2:
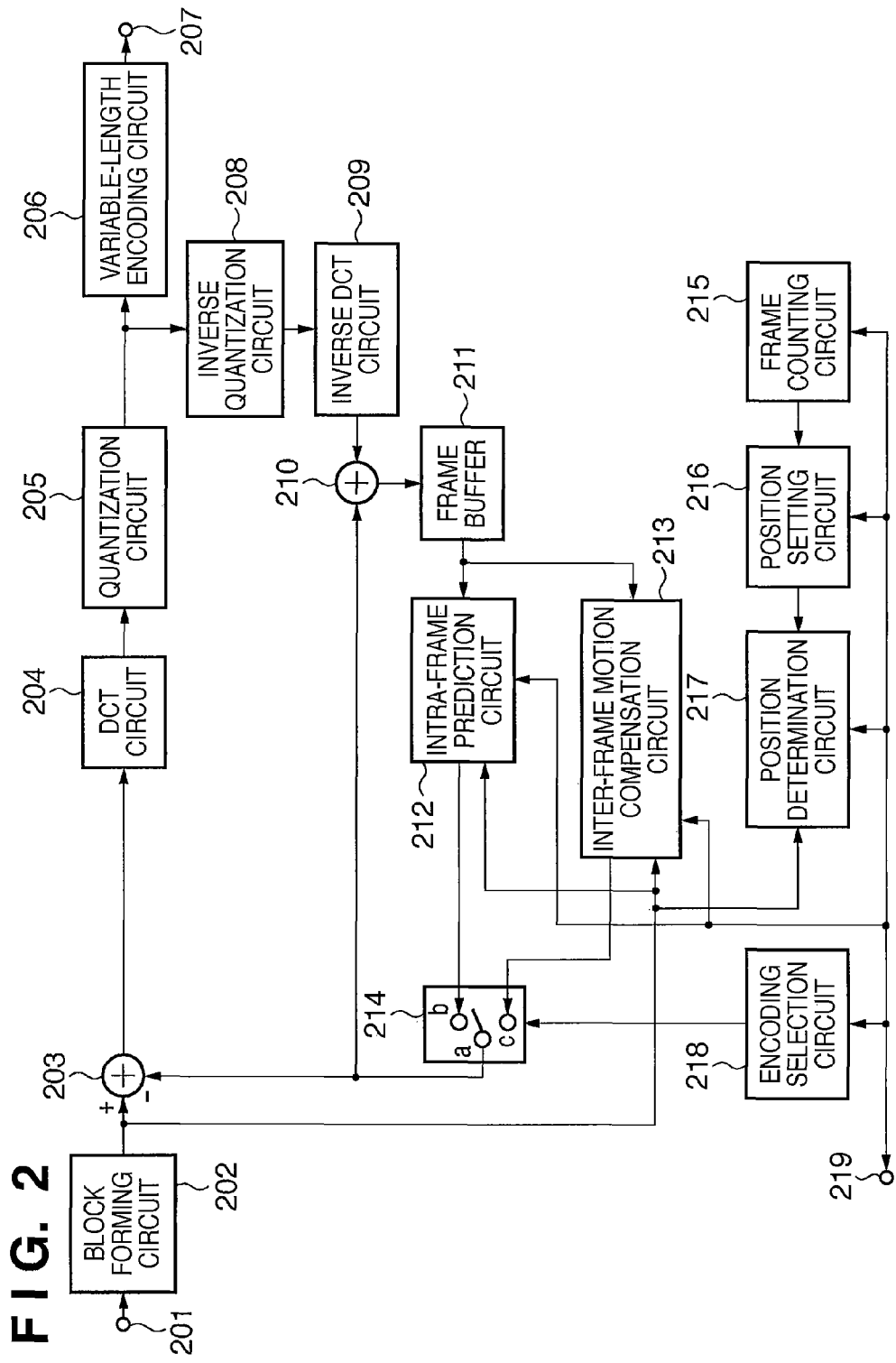
FIG. 2 illustrates an example of the configuration of the image encoding circuit according to the embodiment.

FIG. 2 illustrates the image encoding circuit 103 in detail. An input terminal 201 in the image encoding circuit 103 receives input of the moving image data that has been processed by the image signal processing circuit 102. A block forming circuit 202 forms each frame image into blocks, namely a slice block, macroblock, and DCT blocks. The image encoding circuit 103 further includes an adder 203, a DCT circuit 204, a quantization circuit 205 for quantizing image data that has been processed in the DCT circuit 204, a variable-length encoding circuit 206 for subjecting quantized image data to variable-length encoding, an output terminal 207, an inverse quantization circuit 208, an inverse DCT circuit 209, an adder 210, a frame buffer 211 for buffering locally decoded image data, an intra-frame prediction circuit 212, an inter-frame motion compensation circuit 213, and a switching circuit 214.

Further, a frame counting circuit 215 included in the image encoding circuit 103 is counted up frame by frame. For every frame, a position setting circuit 216 sets an area that takes trickplay into consideration. A position determination circuit 217 determines whether image data that is output from the block forming circuit 202 belongs to an area set by the position setting circuit 216. An encoding selection circuit 218 selects either the output from the intra-frame prediction circuit 212 or the output from the inter-frame motion compensation circuit 213. An input/output terminal 219 inputs and outputs signals to and from the control circuit 109.

Figure 5:
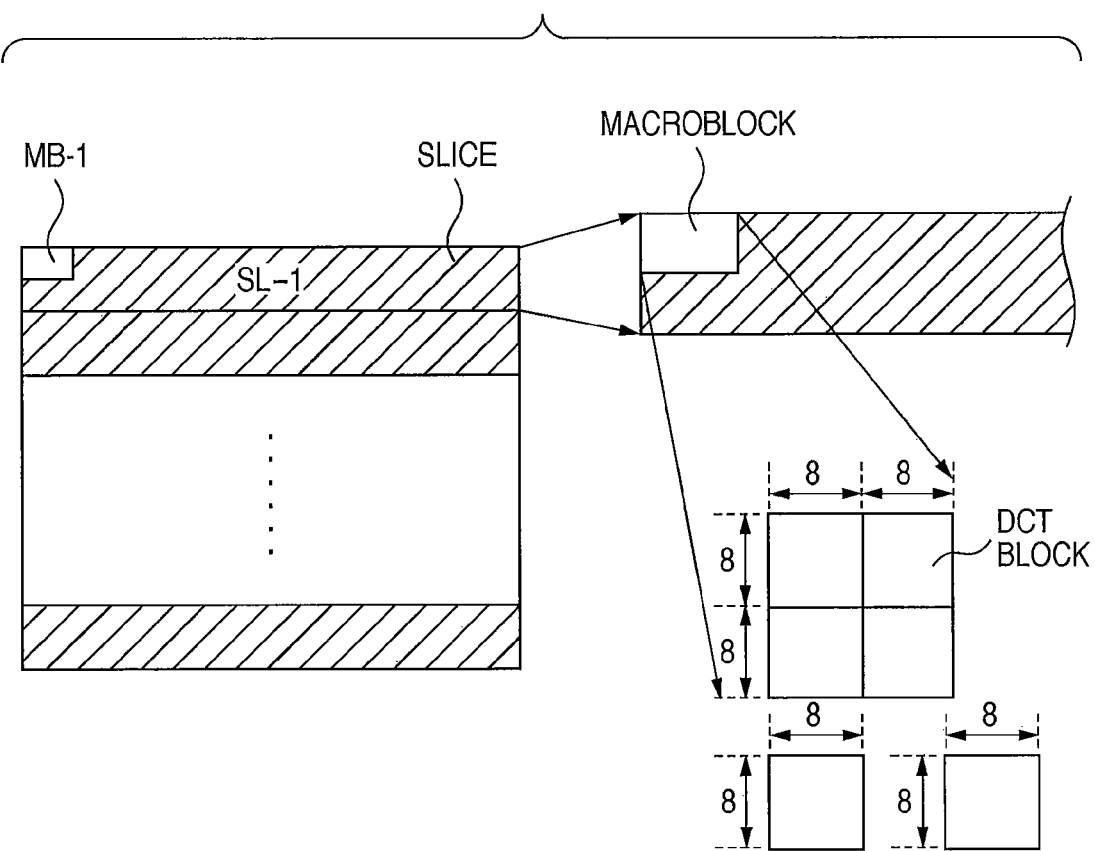
FIG. 5 illustrates the structure of image data to be encoded.

When recording starts, the control circuit 109 initializes the frame counting circuit 215 to set a value 0 and initializes the position setting circuit 216. Image data that has been signal-processed by the image signal processing circuit 102 is input from the input terminal 201 in frame units. As illustrated in FIG. 5, the block forming circuit 202 forms this image data into DCT blocks, a macroblock, and a slice block.

The image data put into block by the block forming circuit 202 is supplied to the adder 203. Since the control circuit 109 encodes the frame F(p) as an IDR frame, it controls the encoding selection circuit 218 and causes this circuit to select terminal b of the switching circuit 214.

The intra-frame prediction circuit 212 sends 0 data to the adder 203 in a case where a block to undergo intra-frame prediction does not exist, as in macroblock MB–1 within slice SL–1 shown in FIG. 5. In a case where an intra-frame prediction has been carried out, on the other hand, the intra-frame prediction circuit 212 sends the generated prediction image to the adder 203.

The adder 203 subtracts the data, which is supplied via the switching circuit 214, from the image data in block form supplied from the block forming circuit 202 and outputs the difference to the DCT circuit 204 as a prediction error. The DCT circuit 204 applies DCT (Discrete Cosine Transform) processing to the prediction error supplied from the adder 203 and sends the result of processing to the quantization circuit 205. The quantization circuit 205 quantizes the result of processing from the DCT circuit 204 and sends the result of quantization to the variable-length encoding circuit 206 and inverse quantization circuit 208.

The variable-length encoding circuit 206 performs variable-length encoding of the quantized data using Huffman encoding, etc., and outputs the encoded data to the output terminal 207. It should be noted that the variable-length encoding circuit 206 may be an arithmetic encoding circuit that arithmetically encodes binary data. The inverse quantization circuit 208 inverse-quantizes the data sent from the quantization circuit 205 and sends the resulting data to the inverse DCT circuit 209.

The inverse DCT circuit 209 applies inverse DCT to the data that has been inverse-quantized by the inverse quantization circuit 208 and supplies the resulting data to the adder 210. The adder 210 adds the data which has processed in the inverse DCT circuit 209 and the prediction image supplied from the switching circuit 214 and stores the sum in the frame buffer 211 as locally decoded data.

When the above-described processing is repeated and encoding of frame F(p) to the IDR ends, processing of frame F(p+1) is executed at time tp+1. When the processing of frame F(p+1) starts, the control circuit 109 increments the count value of the frame counting circuit 215 by one.

In processing of frame F(p+1) and later frames, image data that has been put into block by the block forming circuit 202 is applied to either the intra-frame prediction circuit 212 or inter-frame motion compensation circuit 213, which generates a prediction image. In a case where a block to be encoded is a P-slice or B-slice, motion detection is carried out for the block with image data of another frame other than the current frame that has been locally decoded and stored in the frame buffer 211 and a block for which the prediction error is smallest is searched. If the block to be encoded is an I-slice, then the intra-frame prediction circuit 212 searches for a prediction direction for which the prediction error is smallest in a case where the prediction has been made from reference blocks situated at the left, upper left, above, and upper right of the block.

From the intra-frame prediction circuit 212 and inter-frame motion compensation circuit 213, the control circuit 109 selects, e.g., an encoding method for which the prediction error is smallest and controls the encoding selection circuit 218 to send the prediction image to the adder 203.

The adder 203 computes prediction error from the blocked image data form supplied from the block forming circuit 202 and the prediction image supplied from the switching circuit 214 and sends the result to the DCT circuit 204. The DCT circuit 204 applies DCT processing to the prediction error supplied from the adder 203 and sends the result to the quantization circuit 205. The quantization circuit 205 quantizes the data that has been subjected to DCT by the DCT circuit 204 and sends the result to the variable-length encoding circuit 206 and inverse quantization circuit 208.

The variable-length encoding circuit 206 variable-length encodes the quantized data using Huffman encoding, etc., and outputs the result to the output terminal 207. The inverse quantization circuit 208 inverse-quantizes the quantized data sent from the quantization circuit 205 and sends the resulting data to the inverse DCT circuit 209. The inverse DCT circuit 209 applies inverse DCT to the data that has been inverse-quantized by the inverse quantization circuit 208 and supplies the resulting data to the adder 210. The adder 210 adds the data which has processed in the inverse DCT circuit 209 and the prediction image supplied from the switching circuit 214 and stores the sum in the frame buffer 211 as locally decoded data.

Figure 6:
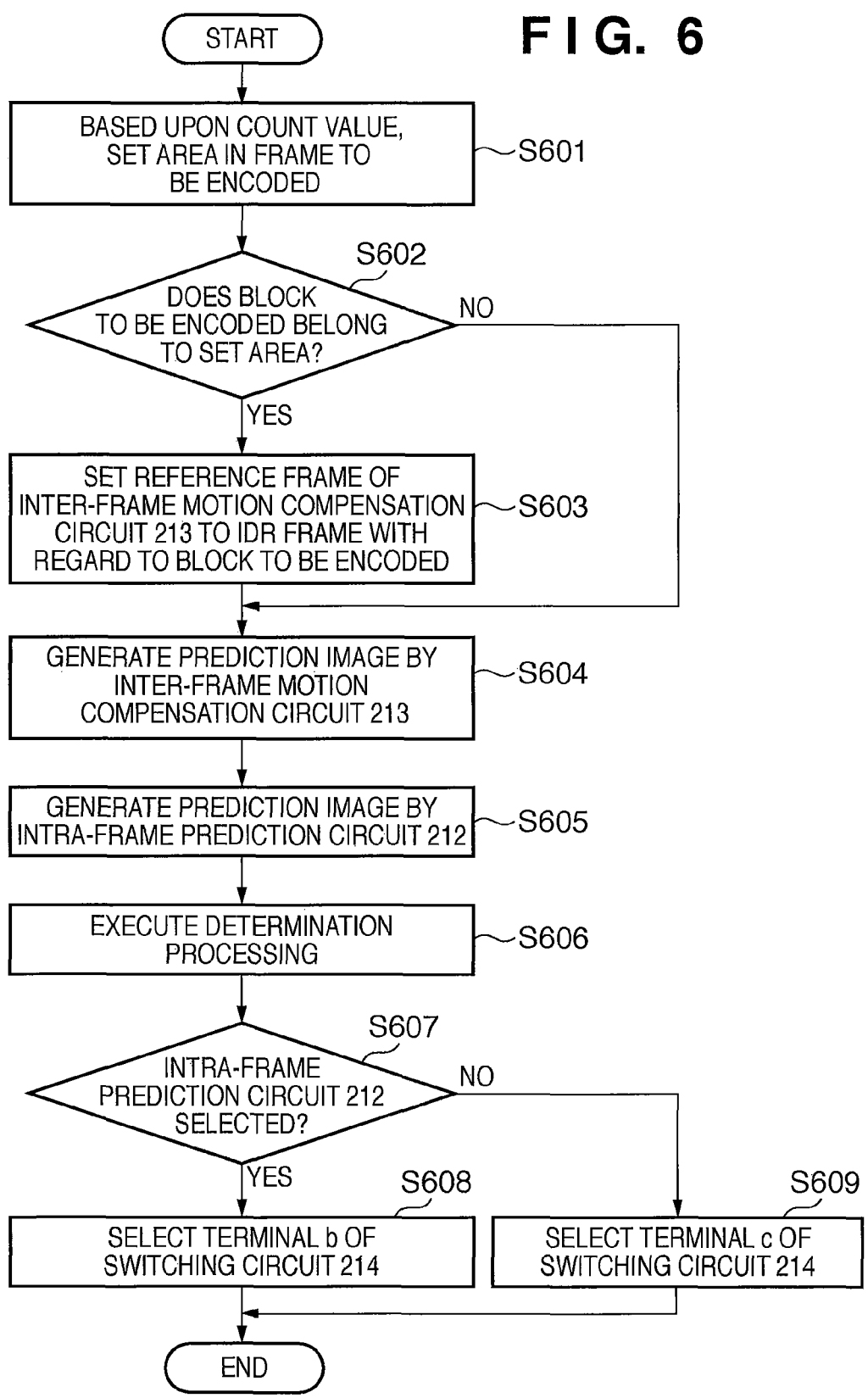
FIG. 6 is a flowchart illustrating an example of processing according to the embodiment.

Here the frame counting circuit 215 is controlled by the control circuit 109 so as to be counted up when processing of every frame ends. In accordance with the count value from the frame counting circuit 215, the position setting circuit 216 sets an area for trickplay. This setting corresponds to the processing of step S601 in the flowchart of FIG. 6. FIG. 6 is a flowchart illustrating an example of processing according to this embodiment of the present invention. Processing corresponding to this flowchart is executed within the image encoding circuit 103 in accordance with control exercised by the control circuit 109.

Figure 3:
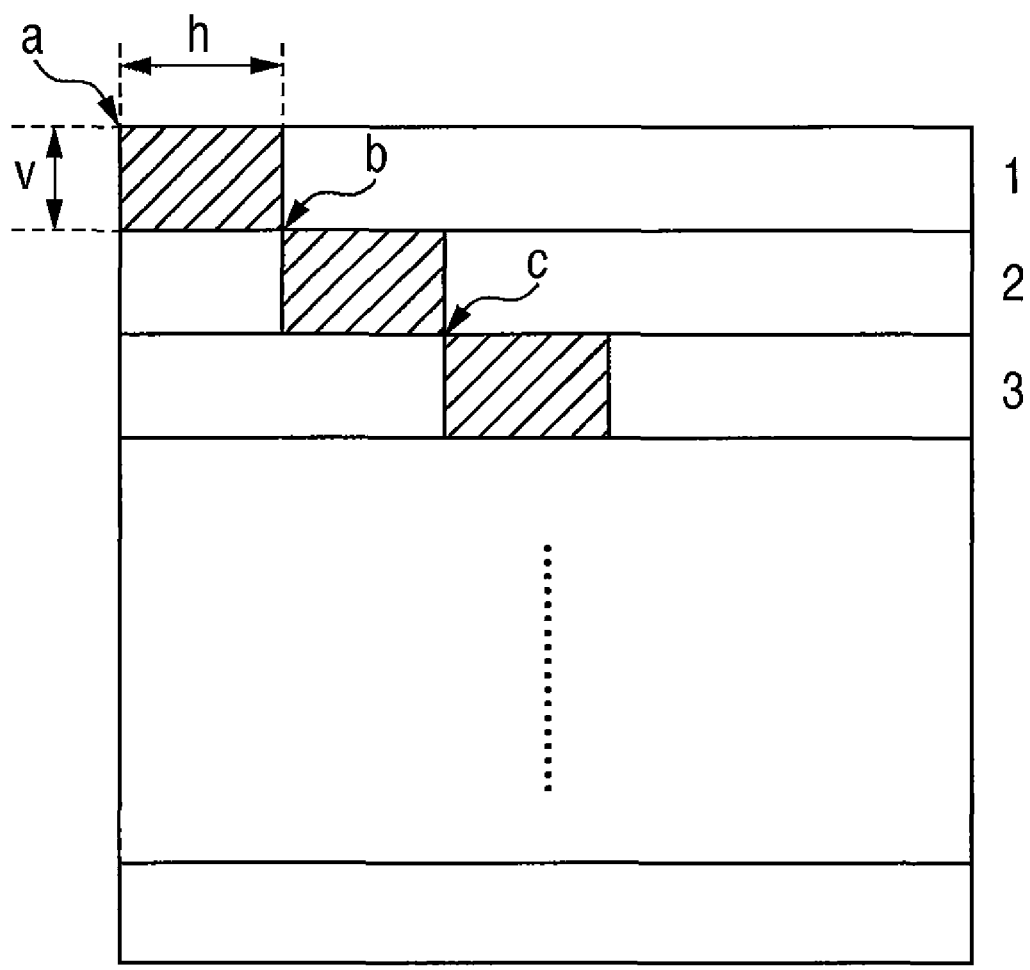
FIG. 3 illustrates an example of setting of areas in a frame according to the embodiment.

As illustrated in FIG. 3, the areas are set by addresses (a, b, c, and so on) in frames and size (h, v) in the horizontal and vertical directions. FIG. 3 illustrates an example in which one frame has been partitioned by a slice in the horizontal direction. The position setting circuit 216 sets the areas by generating addresses in frames in such a manner that set positions will be different from one another at least between mutually adjacent frames.

For example, when the count value in the frame counting circuit 215 is 2, the position setting circuit 216 generates address b and size (h, v). The area-setting information from the position setting circuit 216 is set in the position determination circuit 217.

The position determination circuit 217 determines whether the block to be encoded that is output from the block forming circuit 202 belongs to the area that has been set by the position setting circuit 216 (step S602). This determination can be made based on whether the address of the block to be encoded belongs to the area specified by the address and size (h, v). If it is determined that the block to be encoded belongs to the area ("YES" at step S602), then the control circuit 109 is so notified.

The control circuit 109 sets the frame to which the block to be encoded is to refer in the inter-frame motion compensation circuit 213 to an IDR frame based on the notification from the position determination circuit 217 (step S603). If the case of FIG. 4B is taken as an example, the IDR–0 frame is set. Here the IDR frame set as the reference frame is decodable on its own and, in terms of time, corresponds to a frame ahead of and closest to the frame (the current frame) to be encoded to which the block to be encoded belongs.

In accordance with this setting, at step S604 the inter-frame motion compensation circuit 213 generates a prediction image (first prediction image) by a forward prediction using the reference frame of the block to be encoded as the IbR frame. Further, at step S605, the intra-frame prediction circuit 212 performs an intra-frame prediction of the block to be encoded and generates a prediction image (second prediction image).

At steps S606 to S609, the control circuit 109 controls the encoding selection circuit 218 based on the results of the predictions by the inter-frame motion compensation circuit 213 and intra-frame prediction circuit 212.

Determination processing executed at step S606 will be described in detail. For example, the control circuit 109 compares a first prediction error ascribable to the inter-frame motion compensation circuit 213 with a predetermined first threshold value $\epsilon$ and uses the prediction image from the inter-frame motion compensation circuit 213 if the first prediction error is less than the first threshold value $\epsilon$. On the other hand, if the first prediction error exceeds the first threshold value $\epsilon$, then the control circuit 109 uses the prediction image from the intra-frame prediction circuit 212.

Further, the control circuit 109 may compare a second code amount Q2 in a case where a second prediction error ascribable to the intra-frame prediction circuit 212 has been encoded with a predetermined second threshold value $\alpha$ and, if the second prediction error is less than the second threshold value $\alpha$, may use the prediction image from the inter-frame motion compensation circuit 213. On the other hand, if the second prediction error exceeds the second threshold value $\alpha$, then the control circuit 109 may select the prediction image from the intra-frame prediction circuit 212.

Alternatively, the control circuit 109 may select the prediction image based on a ratio between the second code amount Q2 in a case where the second prediction error ascribable to the intra-frame prediction circuit 212 has been encoded and a first code amount Q1 in a case where the first prediction error ascribable to the inter-frame motion compensation circuit 213 has been encoded. For example, if Q2/Q1 exceeds a predetermined third threshold value $\beta$, the prediction image from the inter-frame motion compensation circuit 213 may be used. On the other hand, if Q2/Q1 is less than the predetermined third threshold value $\beta$, then the prediction value from the intra-frame prediction circuit 212 may be selected.

In a case where the prediction image from the intra-frame prediction circuit 212 is selected ("YES" at step S607), terminal b of the switching circuit 214 is selected at step S608. Further, if the prediction image from the inter-frame motion compensation circuit 213 is selected ("NO" at step S607), then terminal c of the switching circuit 214 is selected at step S609. The prediction image is supplied to the adder 203 in accordance with the result of the selection.

The adder 203 computes the prediction error based on the image data of the block to be encoded supplied from the block forming circuit 202 and the prediction image supplied from the switching circuit 214 and sends the prediction error to the DCT circuit 204. The DCT circuit 204 applies DCT to the prediction error supplied from the adder 203 and sends the result to the quantization circuit 205. The quantization circuit 205 quantizes the data that has been subjected to the DCT in the DCT circuit 204 and sends the result to the variable-length encoding circuit 206 and inverse quantization circuit 208. The processing executed by the inverse quantization circuit 208 onward is similar to that described above and need not be described again.

The variable-length encoding circuit 206 subjects the quantized data to variable-length encoding using Huffman encoding, etc., and outputs the result to the output terminal 207. The variable-length encoded data from the output terminal 207 is output to the stream generation circuit 104 of FIG. 1, additional data for playback is appended and the result is sent to the buffer circuit 105.

The buffer circuit 105 is a buffer that smoothes out discrepancies between the stream generation speed of the image data and the speed at which data is written to the recording medium. When preparations for recording have been made, the stream that has been stored in the buffer circuit is sent to the error correction circuit 106, an error-correction code for recording is appended, and the result is sent to the recording circuit 107. The recording circuit 107 applies modulation for recording and records the encoded image data on the recording medium 108.

When encoding processing of one frame ends, the control circuit 109 counts up the frame counting circuit 215 by one and supplies the position setting circuit 216 with the incremented value. In accordance with the count value supplied from the frame counting circuit 215, the position setting circuit 216 calculates the address and size of the next area for trickplay and sets the result in the position determination circuit 217.

In a case where the encoding of the next frame is carried out, the block for which the area for trick play has been determined by the position determination circuit 217 undergoes inter-frame prediction encoding with the reference frame being the IDR frame or intra-frame encoding and variable-length encoding, as described above. When processing up to the frame that undergoes IDR encoding next ends [frame F(r) at time tr], the control circuit 109 resets the frame counting circuit 215 and repeats the above-described processing.

The control circuit 109 may be so adapted that the IDR frame is encoded at predetermined intervals (e.g., at 15-frame intervals). Alternatively, the IDR frame may be encoded in accordance with the image data that is input (in a case where there is little correlation with the immediately preceding frame).

Thus, in accordance with the present invention, as described above, a block that belongs to a specific position is subjected to encoding processing on a per-frame basis by a forward prediction, which uses an IDR frame as a reference, or an intra-frame prediction. In search mode playback, therefore, after an IDR frame has been decoded, a block that is always decodable exists, regardless of the frame that is played back, the picture is updatable, and the quality of the search image can be improved. Further, since an encoded block that can be decoded exists, regardless of the frame, variable-speed playback is possible.

Other Exemplary Embodiments

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-250067, filed Sep. 26, 2007, which is hereby incorporated by reference herein in its entirety.

What is claimed is:

1. An image processing apparatus that encodes moving image data using inter-frame encoding comprising:
    an inter-frame motion compensation unit configured to refer to a block within a frame other than a current frame to generate a first prediction data of a block to be encoded within the current frame;
    an encoding unit configured to perform prediction encoding using the first prediction data;
    a setting unit configured to set predetermined blocks in a plurality of frames to be encoded by the inter-frame encoding, the setting unit determining the predetermined blocks in accordance with positions of the plurality of frames such that the positions of the predetermined blocks are different from each other between adjacent frames; and
    a control unit configured to control the inter-frame motion compensation unit to generate the first prediction data of the predetermined blocks, upon referring to a frame that is decodable on its own and, in terms of time, is situated ahead of and closest to the current frame.

2. The apparatus according to claim 1, further comprising:
    an intra-frame prediction unit configured to refer to a block within the current frame to generate second prediction data of the block to be encoded,
    wherein the control unit controls the intra-frame prediction unit to generate the second prediction data of the predetermined blocks and controls the encoding unit to perform prediction encoding using one of the first and second prediction data.

3. The apparatus according to claim 2, wherein the control unit selects one of the first and second prediction data based on a comparison between a first threshold value and a prediction error between the first prediction data and the block to be encoded.

4. The apparatus according to claim 2, wherein the control unit selects one of the first and second prediction data based on a comparison between a second threshold value and a code amount which come from encoding of a prediction error between the second prediction data and the block to be encoded.

5. The apparatus according to claim 2, wherein the control unit selects one of the first and second prediction data based on a comparison between a third threshold value and a ratio, said ratio being the ratio of a first code amount which come from encoding of the first prediction error between the first prediction data and the block to be encoded, to a second code amount which come from encoding of the second prediction error between the second prediction data and the block to be encoded.

6. An image processing method that encodes moving image data using inter-frame encoding, comprising:
    generating a first prediction data of a block to be encoded within a current frame by referring to a block within a frame other than the current frame;
    performing prediction encoding using the first prediction data;
    setting predetermined blocks in a plurality of frames to be encoded by the inter-frame encoding, wherein the step of setting includes determining the predetermined blocks in accordance with positions of the plurality of frames such that the positions of the predetermined blocks are different from each other between adjacent frames;
    controlling the step of generating to generate the first prediction data of the predetermined blocks upon referring to a frame that is decodable on its own and, in terms of time, is situated ahead of and closest to the current frame.

7. The method according to claim 6, further comprising generating second prediction data of the block to be encoded by referring to a block within the current frame, and
    wherein the step of controlling includes controlling the step of generating the second prediction data to generate the second prediction data of the predetermined blocks and controlling the step of encoding to perform prediction encoding using one of the first and second prediction data.

8. The method according to claim 7, wherein the step of controlling including selecting one of the first and second prediction data based on a comparison between a first threshold value and a prediction error between the first prediction data and the block to be encoded.

9. The method according to claim 7, wherein the step of controlling includes selecting one of the first and second prediction data based on a comparison between a second threshold value and a code amount which come from encoding of a prediction error between the second prediction data and the block to be encoded.

10. The method according to claim 7, wherein the step of controlling includes selecting one of the first and second prediction data based on a comparison between a third threshold value and a ratio, said ratio being the ratio of a first code amount which come from encoding of the first prediction error between the first prediction data and the block to be encoded, to a second code amount which come from encoding of the second prediction error between the second prediction data and the block to be encoded.

11. An image processing apparatus that encodes moving image data, comprising:

an input unit that inputs moving image data including frames, each of which includes blocks;

an intra-frame encoding unit that encodes a block of a first type to be encoded by an intra-frame encoding using image data in the frame including the block to be encoded;

an inter-frame encoding unit that encodes a block of a second type to be encoded by an inter-frame encoding using a block of the first or second type in a reference frame other than the frame including the block to be encoded;

a control unit that determines which block of the second type in a frame should be encoded using a block of the first type in the reference frame in accordance with the position of the frame such that positions of the determined blocks are different from each other between adjacent frames, and controls the inter-frame encoding unit to encode the determined block using the block of the first type in the reference frame.

12. The apparatus according to claim 11, wherein the control unit sets a block of the first type every predetermined number of frames in the input moving image data and sets a block of the second type in each of frames between two frames including the blocks of the first type, and wherein the control unit controls the inter-frame encoding unit to encode the determined blocks in each of the frames between the two frames including the blocks of the first type by using the block of the first type in the former one of the two frames.

13. The apparatus according to claim 11, wherein the control unit includes a counter that counts a number of frames in the input moving image data and determines the positions of the determined blocks in accordance with a counted value of the counter.

14. The apparatus according to claim 11, wherein the intra-frame encoding unit encodes a difference between image data in the block to be encoded and predictive image data in the frame including the block to be encoded, and the inter-frame encoding unit encodes a difference between the image data in the block to be encoded and predictive image data in the reference frame.

15. An image processing method that encodes moving image data, comprising:

an input step that inputs moving image data including frames, each of which includes blocks;

an intra-frame encoding step that encodes a block of a first type to be encoded by an intra-frame encoding using image data in the frame including the block to be encoded;

an inter-frame encoding step that encodes a block of a second type to be encoded by an inter-frame encoding using a block of the first or second type in a reference frame other than the frame including the block to be encoded;

a control step that determines which block of the second type in a frame should be encoded using a block of the first type in the reference frame in accordance with the position of the frame such that positions of the determined blocks are different from each other between adjacent frames, and controls the inter-frame encoding unit to encode the determined block using the block of the first type in the reference frame.

16. A method according to claim 15, wherein the control step sets a block of the first type every predetermined number of frames in the input moving image data and sets a block of the second type in each of frames between two frames including the blocks of the first type, and wherein the control step controls the inter-frame encoding unit to encode the determined blocks in each of the frames between the two frames including the blocks of the first type by using the block of the first type in the former one of the two frames.

17. A method according to claim 15, wherein the control step counts a number of frames in the input moving image data and determines the positions of the determined blocks in accordance with the counted value.

18. A method according to claim 15, wherein the intra-frame encoding step encodes a difference between the image data in the block to be encoded and predictive image data in the frame including the block to be encoded, and the inter-frame encoding step encodes a difference between the image data in the block to be encoded and predictive image data in the reference frame.

* * * * *